US008427456B2

(12) United States Patent
Anai

(10) Patent No.: US 8,427,456 B2
(45) Date of Patent: Apr. 23, 2013

(54) FLAT DISPLAY DEVICE AND SIGNAL DRIVING METHOD OF THE SAME

(75) Inventor: Kimio Anai, Fukaya (JP)

(73) Assignee: Japan Display Central Inc., Saitama (JP)

( * ) Notice: Subject to any disclaimer, the term of this patent is extended or adjusted under 35 U.S.C. 154(b) by 1035 days.

(21) Appl. No.: 11/968,992

(22) Filed: Jan. 3, 2008

(65) Prior Publication Data

US 2008/0165201 A1 Jul. 10, 2008

(30) Foreign Application Priority Data

Jan. 5, 2007 (JP) ................................ 2007-000681

(51) Int. Cl.
*G09G 5/00* (2006.01)
*G06F 3/038* (2006.01)
*G06F 12/00* (2006.01)
*G06F 12/06* (2006.01)

(52) U.S. Cl.
USPC ............ 345/204; 345/564; 345/571; 345/574

(58) Field of Classification Search .......... 348/441-459; 345/204, 530-574
See application file for complete search history.

(56) References Cited

U.S. PATENT DOCUMENTS 5,307,085 A * 4/1994 Nakamura ...................... 345/99
6,014,179 A * 1/2000 Kobayashi et al. ........... 348/556
6,801,250 B1 * 10/2004 Miyashita .................. 348/220.1
2002/0126071 A1 * 9/2002 Kojima et al. .................. 345/60
2005/0219188 A1 * 10/2005 Kawabe et al. ................. 345/94

FOREIGN PATENT DOCUMENTS

| | | |
|---|---|---|
| JP | 4-29196 | 1/1992 |
| JP | 5-143024 | 6/1993 |
| JP | 2000-194308 | 7/2000 |
| JP | 2001-13926 | 1/2001 |
| JP | 2001-86391 | 3/2001 |
| JP | 2002-199248 | 7/2002 |

OTHER PUBLICATIONS

Notice of Reasons for Rejection issued by the Japanese Patent Office in Japanese Patent Application No. 2007-000681, mailed Feb. 28, 2012, (2 pages)

* cited by examiner

*Primary Examiner* — Amr Awad
*Assistant Examiner* — Andre Matthews
(74) *Attorney, Agent, or Firm* — Finnegan, Henderson, Farabow, Garrett & Dunner, LLP

(57) ABSTRACT

A flat display device has a circuit configuration in which a division-driving system and an aspect conversion are integrated with each other, and performs driving appropriate to achieve higher resolution even in driving a display unit. The device comprises a memory circuit which includes n unit memories each storing unit data, a display unit of which the horizontal driver is supplied signals read from the memory circuit and of which the regions divided into a plurality of portions in a horizontal direction is division-driven, and a memory control circuit which divides a digital video signal of one line into n, supplies n pieces of the unit data to the n unit memories, selects each direction of write or read addresses of the n unit memories, and outputs the read addresses so that the arrangement order of the unit data for the adjacent regions is set in an inversion horizontal direction.

8 Claims, 9 Drawing Sheets

FLAT DISPLAY DEVICE AND SIGNAL DRIVING METHOD OF THE SAME

CROSS-REFERENCE TO RELATED APPLICATIONS

This application is based upon and claims the benefit of priority from prior Japanese Patent Application No. 2007-000681, filed Jan. 5, 2007, the entire contents of which are incorporated herein by reference.

BACKGROUND OF THE INVENTION

1. Field of the Invention

One embodiment of the invention relates to a flat display device and a signal driving method of the same. For instance, the flat display device is effective as a liquid display device, and it is configured so as to apply division-driving to a display unit and to perform field angle (aspect)-switching by effectively utilizing the division-driving.

2. Description of the Related Art

In a flat display device with an aspect ratio of 9:16, to display a video signal with an aspect ratio of 3:4, aspect transformation processing is performed. An aspect transformation processing unit is called a scaler, in which the numbers of horizontal pixels and vertical lines are increased or decreased. Such a technique is disclosed, for example, in Jpn. Pat. Appln. KOKAI Publication No. 2001-086391 and Jpn. Pat. Appln. KOKAI Publication No. 2002-199248.

In recent years, higher definition and larger screen have been attained. As to a driving circuit to correspond to a large screen, a so-called division-driving system, which divides a screen region into plural ones to input pixel data independently in each divided region, has been a possible approach. As for a technique of the division-driving system, a technique is disclosed, e.g., in Jpn. Pat. Appln. KOKAI Publication No. 2000-194308.

However employing the division-driving system further requires a memory on a data input path. As a result, a memory required by the aspect transformation processing unit and a memory for the division-driving system are needed, so that it results in an increase in manufacturing costs.

BRIEF SUMMARY OF THE INVENTION

An object of the embodiments of the present invention, is to provide a circuit configuration in which a division-driving system and an aspect transformation is integrated, and to provide a flat display device configured to perform driving appropriate to a higher definition even in driving a display unit.

According to one aspect of the present invention there is provided an apparatus comprising: a memory circuit which substantially includes four unit memories respectively storing unit data corresponding to the dividing region; a horizontal driver which has a plurality of registers which are supplied signals read from the memory circuit; a flat display device including a display panel which is driven by the horizontal driver and a vertical driver and to which regions divided into four sections in a horizontal direction in accordance with the four registers; and a memory control circuit which transfers the data in the unit memories to the registers, wherein the memory control circuit supplies unit data of the number of display dividing regions, which have been obtained by dividing one line of a digital video signal with an aspect ratio of 3:4 into the number corresponding to the display dividing regions, to the unit memories, and selects access directions of write or read addresses for the unit memories so that each piece of the data to be transferred from the unit memories to the registers becomes an inversion horizontal direction between the adjacent display division regions.

Additional objects and advantages of the embodiments will be set forth in the description which follows, and in part will be obvious from the description, or may be learned by practice of the invention. The objects and advantages of the invention may be realized.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
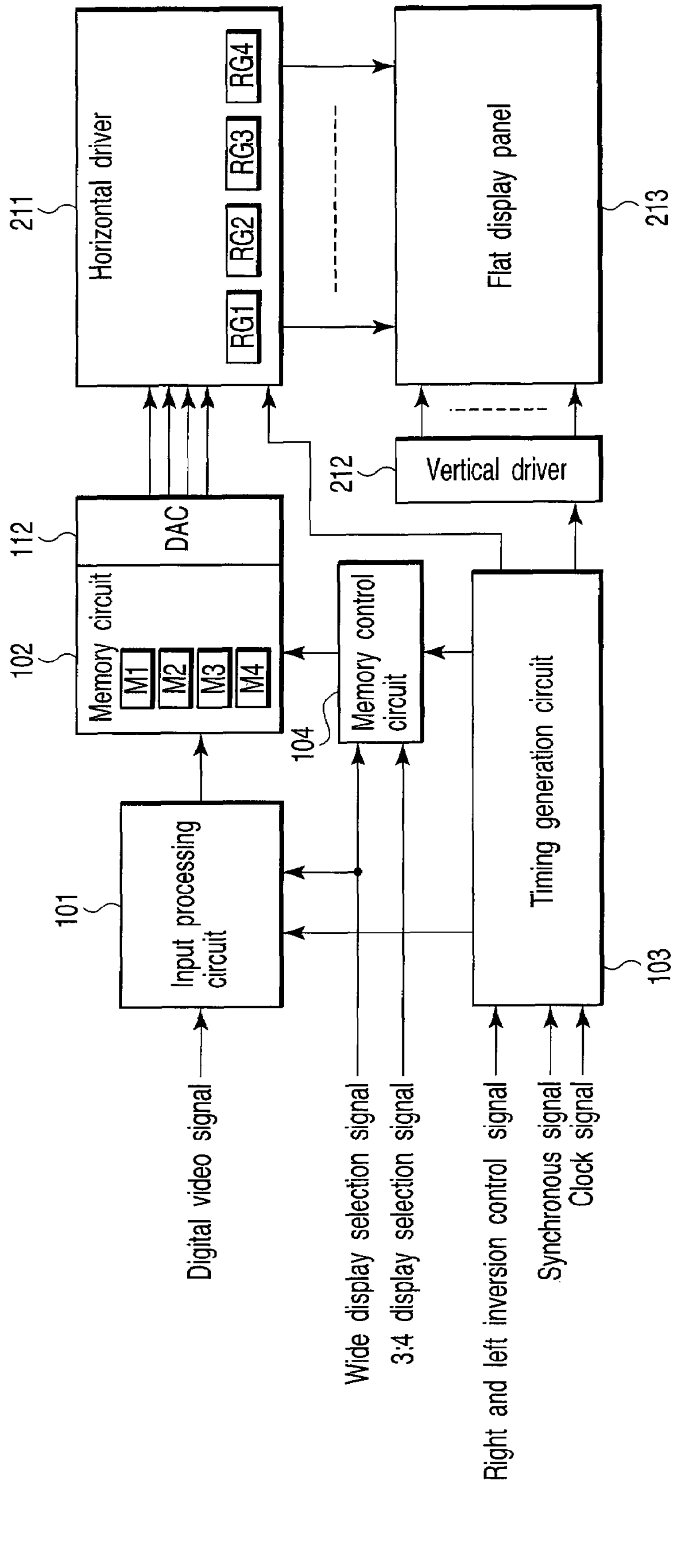
FIG. 1 is a preferred block diagram illustrating one embodiment of a flat display device regarding the invention.

Various embodiments according to the invention will be described hereinafter with reference to the accompanying drawings.

In a concrete embodiment of the present invention, a flat display device includes a memory circuit including four unit memories to each store unit data and a horizontal driver of which the four corresponding-registers are supplied signals read from the memory circuit. Further, the flat display device includes a display panel which is driven by the horizontal driver and a vertical driver and to which regions divided into four sections in a horizontal direction in accordance with the four registers and a memory control circuit which transfers the data in the four unit memories.

The display device divides one line of a digital video signal of a 3:4 aspect ratio into three to obtain three pieces of the unit data. Next, the display device supplies the three pieces of unit data to three unit memories among four unit memories. Further, the display device selects address directions of write or read addresses to the three unit memories among the four unit memories so that each piece of data to be transferred from the three unit memories to the three registers becomes an inverse horizontal direction between the adjacent regions.

According to the foregoing means, the regions divided into, e.g., n pieces in a horizontal direction is applied division-driving, and a digital video signal of one line is divided into n pieces, and n pieces of the unit data is assigned to the n pieces of the unit memories, respectively. Since the display device controls the writing and reading to and from the n unit memories, the display device may switch the aspect ratio. Further, since the display device selects the direction of the address of the writing or reading for each of unit memories, and brings arrangement order of the data in the adjacent regions into an inverse horizontal direction, the display device may reduce noise in images on borders of regions caused by the division-driving.

Hereinafter, moreover, the embodiments of the invention will be described with reference to the drawings. The digital video signal is input to a memory circuit 102 via an input processing circuit 101. The memory circuit 102 has a plurality of memories in order to apply division-driving to a flat display panel 213 as a display unit. The memory circuit 102 has, for example, four memories M1-M4 each having consecutive addresses. A signal read from each memory of the memory circuit 102 is each converted to analog by a digital-to-analog converter (DAC) 112 to be input in a horizontal driver 211. Within the DAC 112, analog-to-digital conversion units corresponding to each memory M1-M4 are installed.

The horizontal driver 211 also includes registers RG1-RG4 corresponding to the memories. When signals in one horizontal period are input to the driver 211, the signals in one horizontal period are supplied concurrently to pixels on the horizontal line driven by the vertical driver 212. On the display 213, a pixel array is structured by using, for example, a polysilicon substrate.

A memory control circuit 104 controls a plurality of memories M1-M4 of the memory circuit 102. A wide display selection signal and a 3:4 display selection signal switch driving forms of the plurality of memories M1-M4.

A synchronous signal and a clock signal are input to a timing generation circuit 103. The timing generation circuit 103 generates a variety of timing signals by using the synchronous signal and the clock signal. The timing signal from the generation circuit 103 decides an operation sequence of the control circuit 104. The timing signal from the generation circuit 103 also decides operation sequences of the horizontal driver 211 and the vertical driver 212. Other than this, although not illustrated, the generation circuit 103 also supplies the timing signal and the clock signal to the input processing circuit 101 and the DAC 112.

Figure 2:
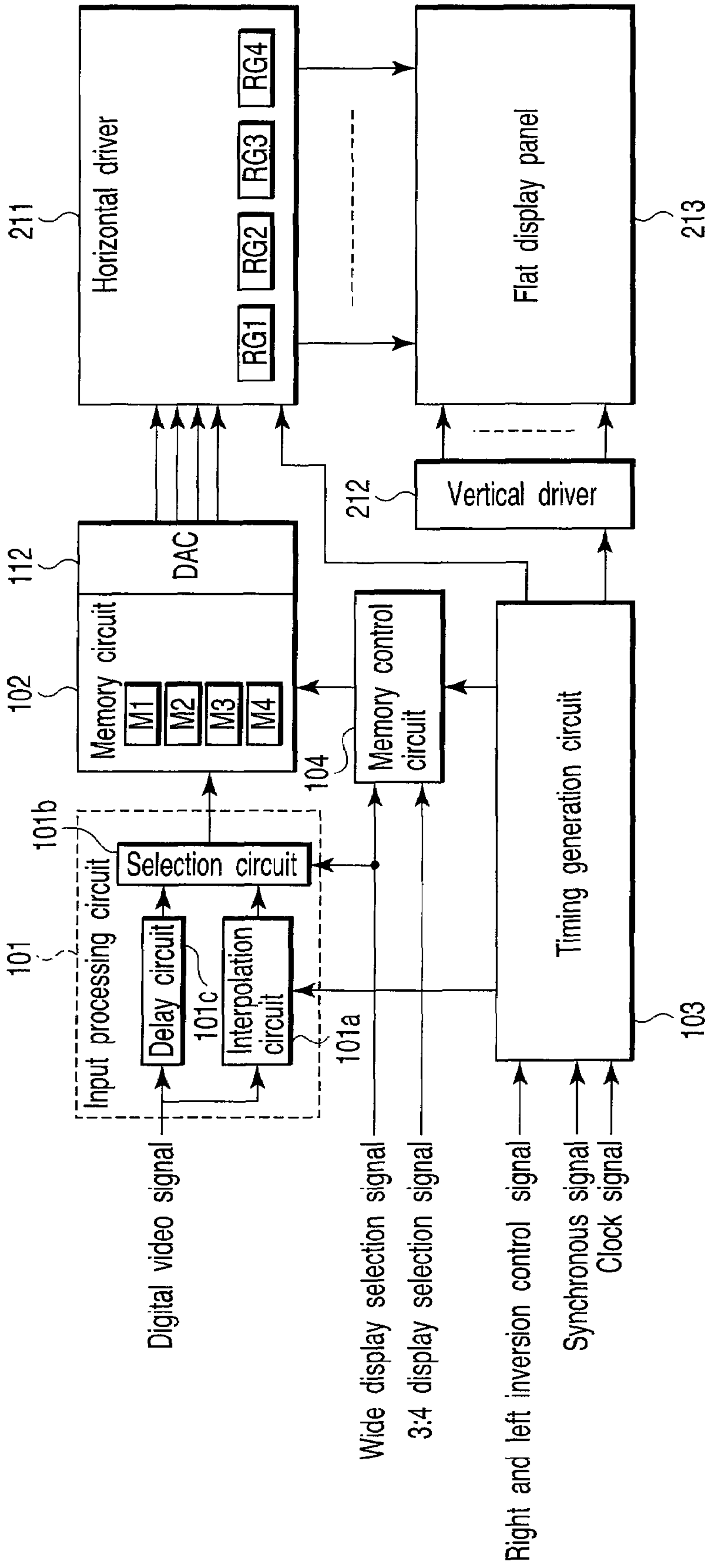
FIG. 2 is a preferred block diagram illustrating another embodiment of the flat display device regarding the invention.

FIG. 2 illustrates another embodiment, and illustrates an example in which the input processing circuit 101 includes an interpolation circuit 101*a*, a selection circuit 101*b* and a delay circuit 101*c*. Other parts are the same as those of FIG. 1, and they are designated by the identical symbols. The interpolation circuit 101*a* may apply, for example, a line interpolation, and the selection circuit 101*b* is also a unit to select and switch between an interpolation line and a current line. The interpolation circuit 101*a* may apply a pixel interpolation and the line interpolation. The delay circuit 101*c* is a circuit to perform a time adjustment.

Figure 3A:
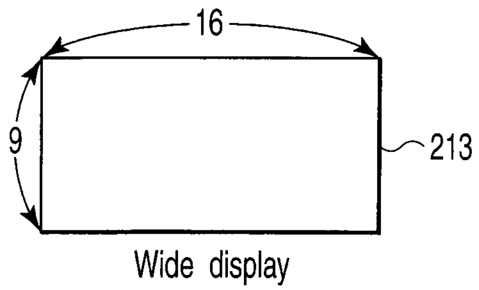
FIGS. 3A to 3D are preferred views illustrating a various forms of aspect ratios at display panels illustrated in FIGS. 1 and 2.
Figure 3B:
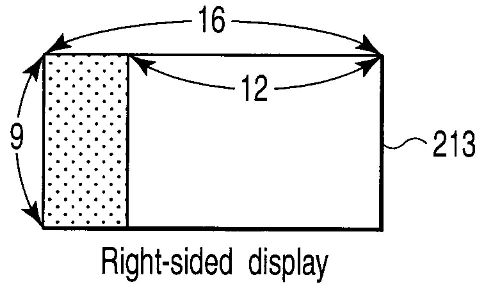
Figure 3C:
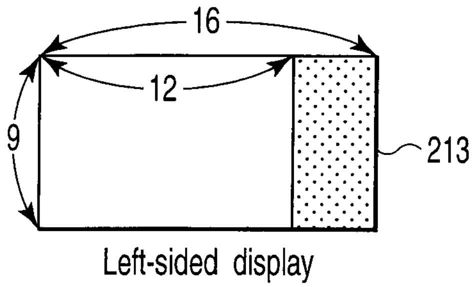
Figure 3D:
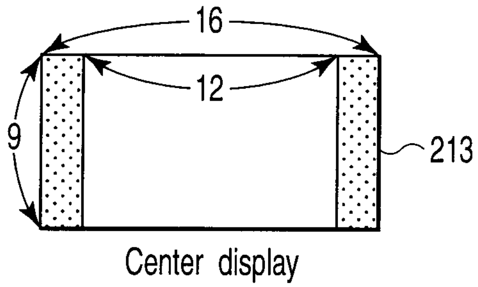

FIG. 3A shows an example of an image which is full-displayed on a display panel 213 having an aspect ratio of 9:16. FIGS. 3B-3D each depicts an example displaying an image having an aspect ratio of 3:4 on the display panel 213 with an aspect ratio of 9:16. To transform the aspect ratio of 9:16 to the aspect ratio of 3:4, a right-sided display (FIG. 3B), a left-sided display (FIG. 3C) and a centered display (FIG. 3D) are possible approaches.

FIGS. 4A, 4B, 5A and 5B are views showing how the image data has written to the memory circuit 102 in order to display the image with the aspect ratio of 3:4 onto the display panel 213 with the aspect ratio of 9:16, and the read addresses are read in order of ascending addresses.

Figure 4A:
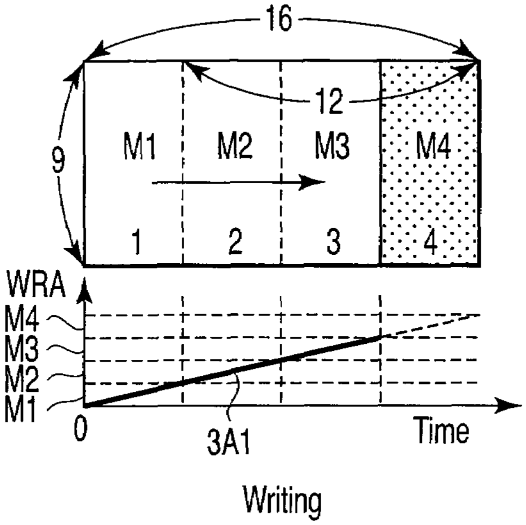
FIGS. 4A and 4B are preferred explanation views illustrating examples of data writing to memory circuits illustrated in FIGS. 1 and 2.
Figure 4B:
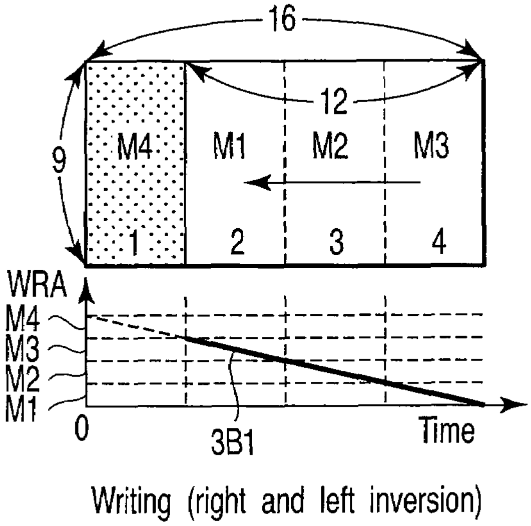

Firstly, FIGS. 4A and 4B will be described. Here, FIGS. 4A and 4B depict relationships of write addresses (WRAs) to the divided driving regions 1-4 of the display panel 213 to be applied the division-driving and four memories M1-M4 within the memory circuit 102. The four memories M1-M4 are unit memories of capacities which four-divides the pixel on the horizontal line. An upper stage of FIG. 4A depicts an aspect in which the display panel 213 is four-divided in a horizontal direction. Four regions 1-4 are set on the display panel 213. A lower state of FIG. 4A depicts an example of addresses in which a longitudinal axis is assigned to four memories M1-M4, and a lateral axis is a time axis. In this case, four memories M1-M4 are assigned to each region 1-4, respectively. A full line 3A1 in a lower stage of FIG. 4A depicts an aspect in which write addresses to memories M1-M4 vary. FIG. 4A shows an aspect in which the write addresses vary in the case of the left-sided display.

A full line 3B1 in a lower stage of FIG. 4B also depicts an aspect in which write address to the memories 1-4 vary. This case shows an example in which the right-sided display is performed, and the data is written by inverting the right and left.

Figure 5A:
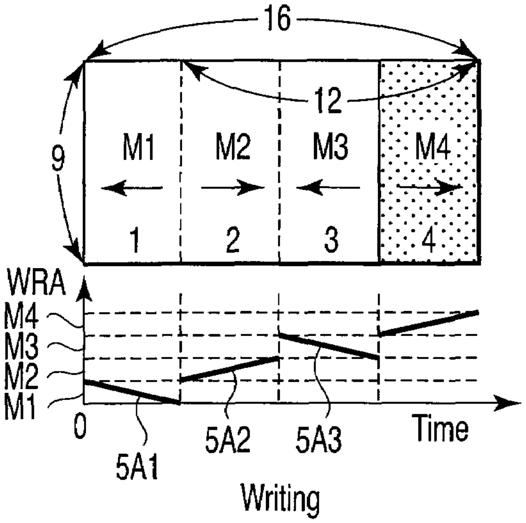
FIGS. 5A and 5B are preferred explanation views illustrating other examples of data writing to memory circuits illustrated in FIGS. 1 and 2.
Figure 5B:
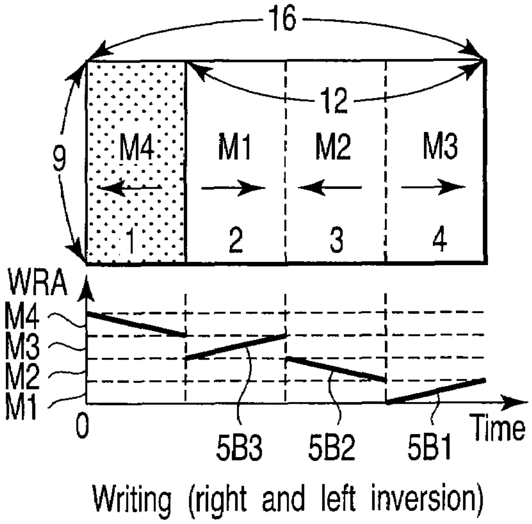

FIGS. 5A, 5B shows the cases in which the write directions of the data are controlled so that the arrangement order of the data in the adjacent regions becomes an inversion horizontal direction and the read addresses are read in order of ascending addresses.

FIG. 5A also shows a relationship among the division-driving regions 1-4 of the display panel 213 to be applied the division-driving and the write addresses (WRA) to the four memories M1-M4 in the memory circuit 102. The four memories M1-M4 are the unit memories of the capacities dividing the pixels on the horizontal line into four. The upper stage of FIG. 5A shows a left-sided display and an aspect in which the display panel 213 is divided into four in the horizontal direction, then, the four regions 1-4 are set. The lower stage of FIG. 5A shows depicts an example of the addresses by which the longitudinal axis is assigned to the four memories M1-M4, and the lateral axis indicates a time axis. In this case, the four memories M1-M4 are assigned to the regions 1-4, respectively. Memory M1, as shown as a full line 5A1, writes the data in order of descending addresses, memory M2, as shown as a full line 5A2, writes the data in order of ascending addresses, and memory M3, as shown as a full line 5A3, writes the data in order of descending addresses.

The full lines 5B3, 5B2 and 5B1 in the lower stage of FIG. 5B also indicates an aspect of the variations in write address. In this case, FIG. 5B shows an example of a right-sided display, and also it shows the example in which the data is written by inverting the right and left. Like this, it is easily achieved for displaying the screen by inverting the right and left to invert the selection order of memories M1-M4 and by inverting the address directions.

Figure 6:
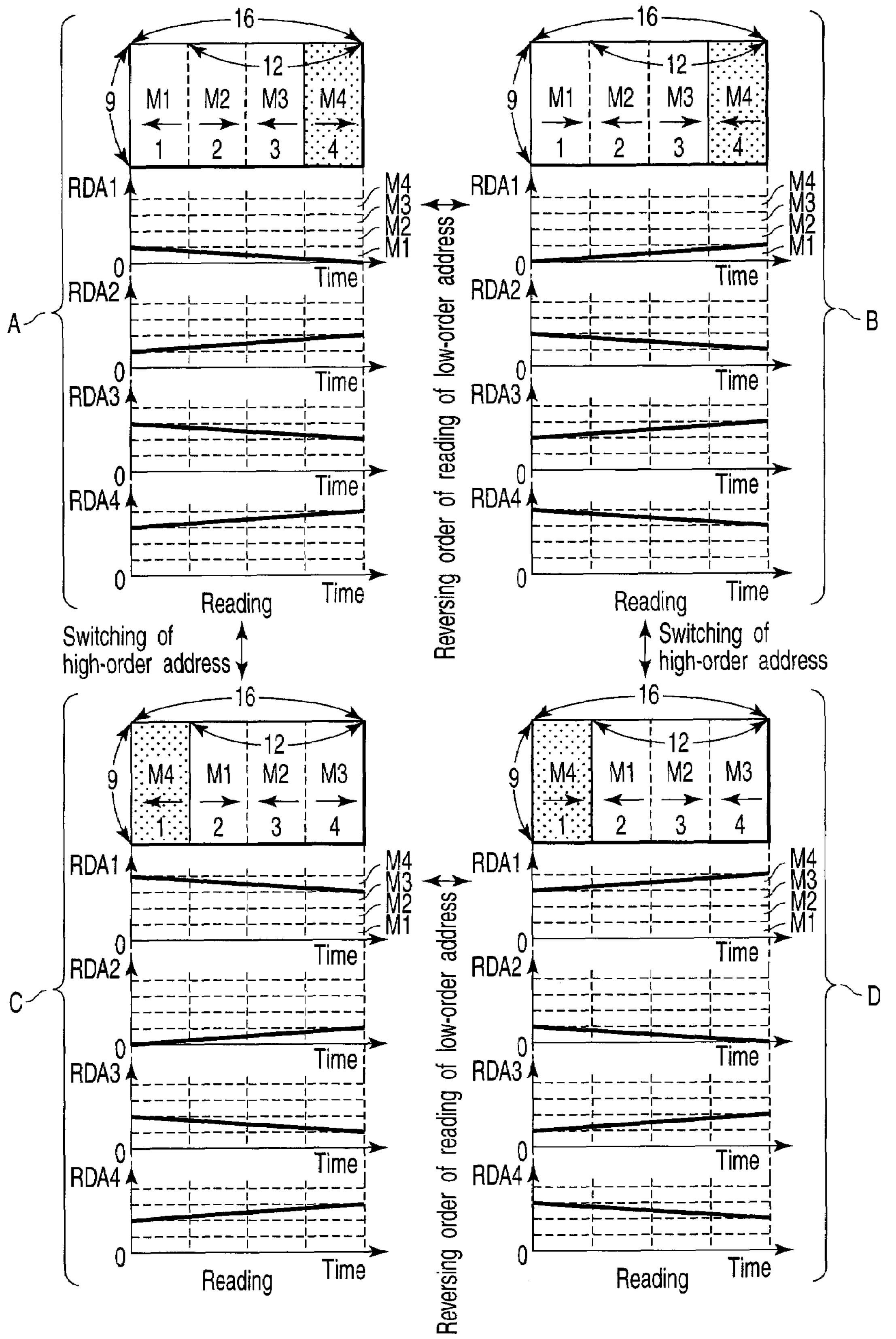
FIG. 6 is a preferred explanation view illustrating examples of reading the data from the memory circuits illustrated in FIGS. 1 and 2.

Examples A to D of FIG. 6 show four kinds of read addresses in reading the data from memories M1-M4 in the states in which the data has been written to memories M1-M4 as shown in FIG. 4A. The data in each of memories M1-M4 is read by one horizontal period, each converted to analog and supplied to the corresponding-registers RG1-RG4 in the horizontal driver 211.

Such slow reading poses a secure operation, and especially, it is effective to a device for performing analog transfer which is weak in high-speed response.

The case of example A of FIG. 6 will be described. Arrows are described in the division-driving regions 1-4 of example A in FIG. 6. The arrows indicate the directions by which the data is read from memories M1-M4 and the data is supplied to the horizontal driver 211, respectively. The horizontal driver 211 includes four register units to which output data from each memory M1-M4 is each converted to analog to be written, respectively. The register units also independently store the data in response to each region 1-4. When signals of one horizontal line are set into all the register units, the corresponding-signals are supplied all at once to the pixels on a horizontal line specified by the vertical driver 212.

Four kinds of read addresses RDA1-RDA4 differing in address value are the read addresses. The four kinds of read addresses RDA1-RDA4 are output from a memory control circuit 104 to be supplied to the memory circuit 102. In the case of example A of FIG. 6, the variation in a first read address RDA1 accesses memory M1 for one horizontal period in a direction opposite to the write direction. The variation in a second read address RDA2 accesses memory M2 for one horizontal period in the same direction as that of the write direction. The variation in a third read address RDA3 accesses memory M3 for one horizontal period in a direction opposite to the write direction. The variation in a fourth read address RDA4 accesses memory M4 for one horizontal period in the same direction as that of the write direction.

The case of example B in FIG. 6 will be described. The arrows of the division-driving regions 1-4 of example B in FIG. 6 and the arrows of the division-driving regions 1-4 of example A in FIG. 6 are inverse to one another. Therefore, the read directions of the data from memories M1-M4 and those of example A of FIG. 6 are inverse to one another.

The case of an example C will be described. Examples C and D of FIG. 6 are examples in which the display panel 213 displays the right-sided display. In comparison to example A of FIG. 6, high-order addresses are switched so that the data read from the memory M1, the data read from memory M2, the data read from memory M3, and the data read from memory M4 is displayed in the regions 1, 2, 3 and 4, respectively. The arrows of the division-driving regions 1-4 of example C in FIG. 6 and those of the division-dividing regions 1-4 of example A in FIG. 6 are mutually the same. However, in comparison to the case of example A of FIG. 6, in the case of examples C and D of FIG. 6 are examples to perform the right-sided display. In this case, the variation in the first read address RDA accesses memory M4 for one horizontal period in the direction opposite to the write direction. The variation in the second read address RDA2 accesses memory M1 for one horizontal period in the same direction as that of the write direction. The variation in the third read address RDA3 accesses memory M2 for one horizontal period in the direction opposite to the write direction. The variation of the fourth read address RDA4 accesses memory M4 for one horizontal period in the same direction as that of the write direction.

An example D in FIG. 6 is an example in which the variation directions of the first to fourth read addresses RD1-RD4 become opposite to those of example C in FIG. 6.

Figure 7:
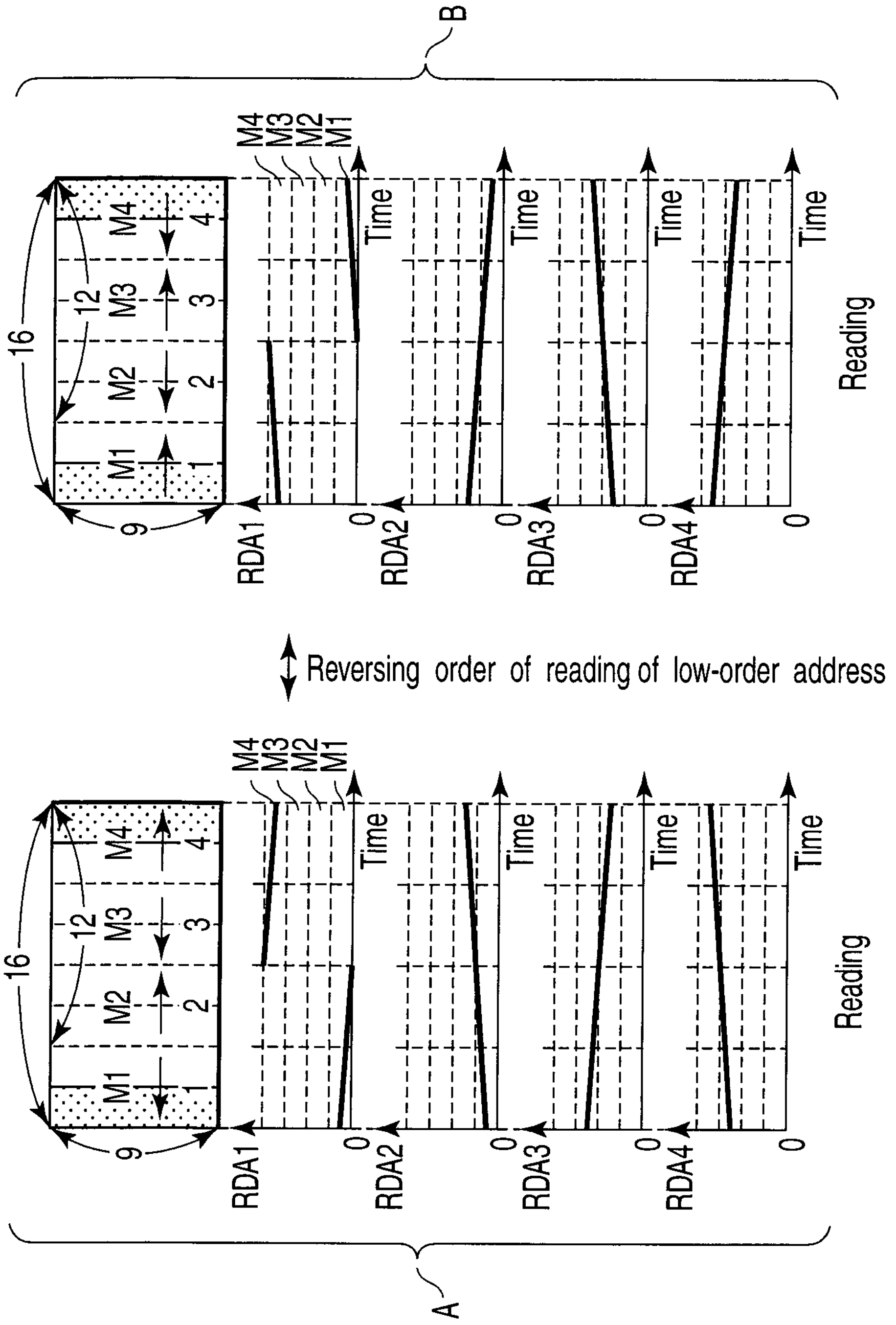
FIG. 7 is a preferred explanation view illustrating other examples of reading the data from the memory circuits illustrated in FIGS. 1 and 2.

An example A of FIG. 7 and an example B of FIG. 7 show aspects in which the read addresses RDA1-RDA4 of memories M1-M4 in performing a centered display. It is assumed that the data has been written to memories M1-M4 as described in FIG. 4A.

In example A in FIG. 7, the variation in the read address RDA1 read each half data of memory M1 and memory M4 in the anterior half and the posterior half of the one horizontal period. The variation of the read address RDA2 read the data of each half of the memories 1 and 2 for the one horizontal period. The variation of the read address RDA3 read the data of each half of the memories 3 and 2 for the one horizontal period. The variation of the read address RDA4 read the data of each half of the memories 3 and 4 for the one horizontal period. The arrows described on the display panel 213 at the upper stage show the signal write directions to the horizontal driver 211 for each region 1-4 on the display panel 213. Example B in FIG. 7 illustrates an example in which the read directions are made opposite to those of example A in FIG. 7.

The foregoing example A to example B of FIG. 6 illustrates read methods in the case in which the data is written to memories M1-M4 as shown in FIG. 4A. However, when the data is written to memories M1-M4 in the methods depicted in FIG. 5A, the read methods are depicted as examples A in FIG. 8 to B in FIG. 9.

Figure 8:
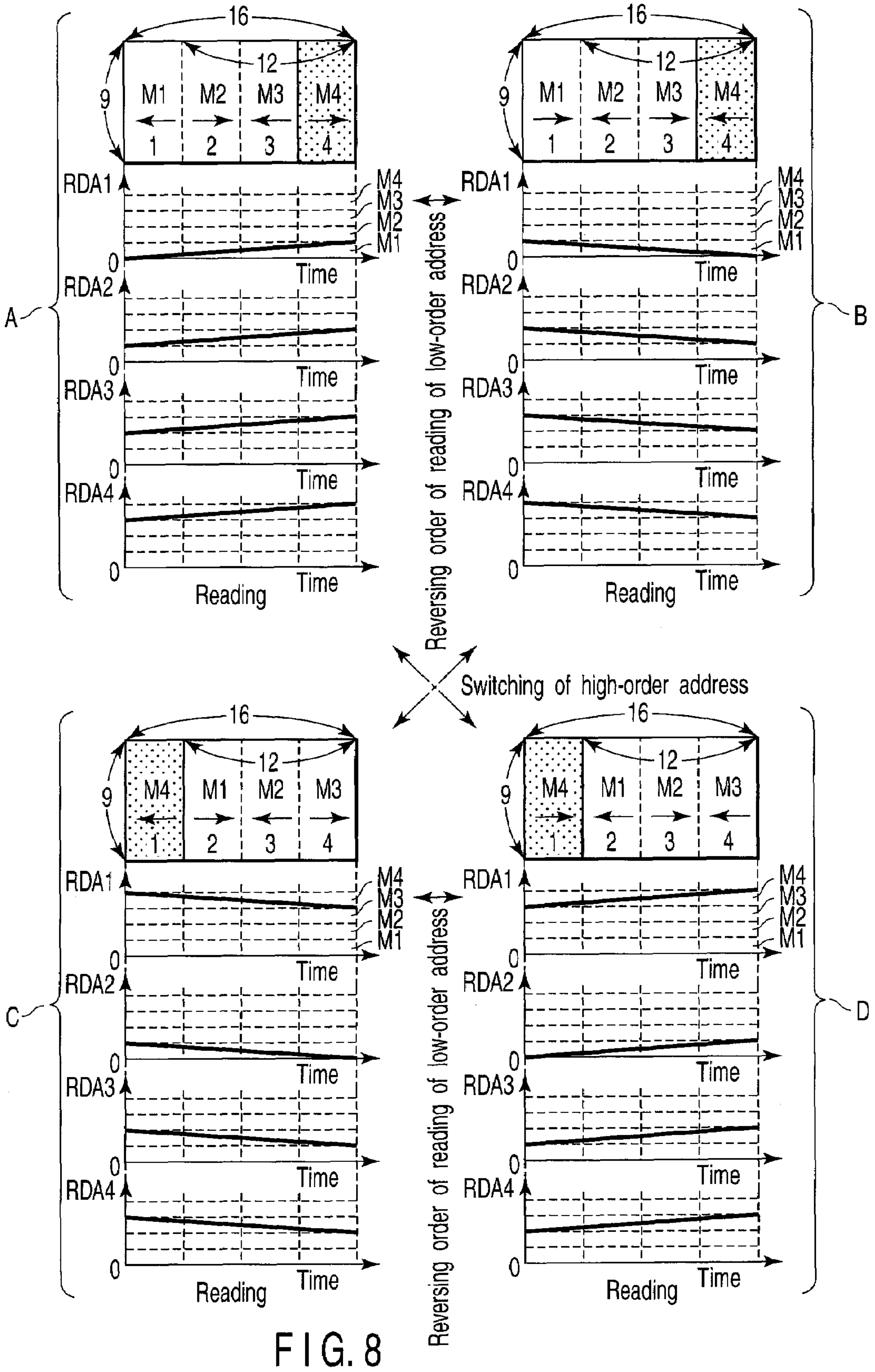
FIG. 8 is a preferred explanation view illustrating other examples of reading the data from the memory circuits illustrated in FIGS. 1 and 2.

As first, example A in FIG. 8 will be described. The variation in read address RDA1 accesses memory M1 in the direction opposite to the write direction. It takes almost one horizontal period for the variation in read address RDA1 to read the data in memory M1 in the direction opposite to the write direction.

It takes almost one horizontal period for the variation of read address RDA2 to read the data in memory M2 in the same direction as that of the write direction. It takes almost one horizontal period for the variation of read address RDA3 to read the data in memory M3 in the direction opposite to the write direction. It takes almost one horizontal period to read the data in memory M4 in the same direction as that of the write direction. As a result, the write directions of the signals into each region 1-4 in the display panel 213 are shown as the arrows in the display panel 213 at the upper stage of example A in FIG. 8. On the contrary, if the address variation direction of each read address RDA1-RDA4 is set in the direction opposite to that of example A in FIG. 8, the write directions of the signals are given as shown at example B in FIG. 8.

Example C of FIG. 8 will be described. Read address RDA1 varying in the direction opposite to the write direction accesses memory M4. Read address RDA2 varying in the same direction as the write direction accesses memory M1. Read address RDA3 varying in the direction opposite to the write direction accesses memory M2. Read address RDA4 varying in the same direction as the write direction accesses memory M3. As a result, the write directions of the signals for each region 1-4 of the display panel 213 into the horizontal driver 211 are depicted as the arrows on the display panel 213 at the upper stage of example C in FIG. 8. On the contrary, if the address variation direction of each read address RDA1-RDA4 is set to the direction opposite to that of example C in FIG. 8, the foregoing write directions are set as shown in example D of FIG. 8.

Figure 9:
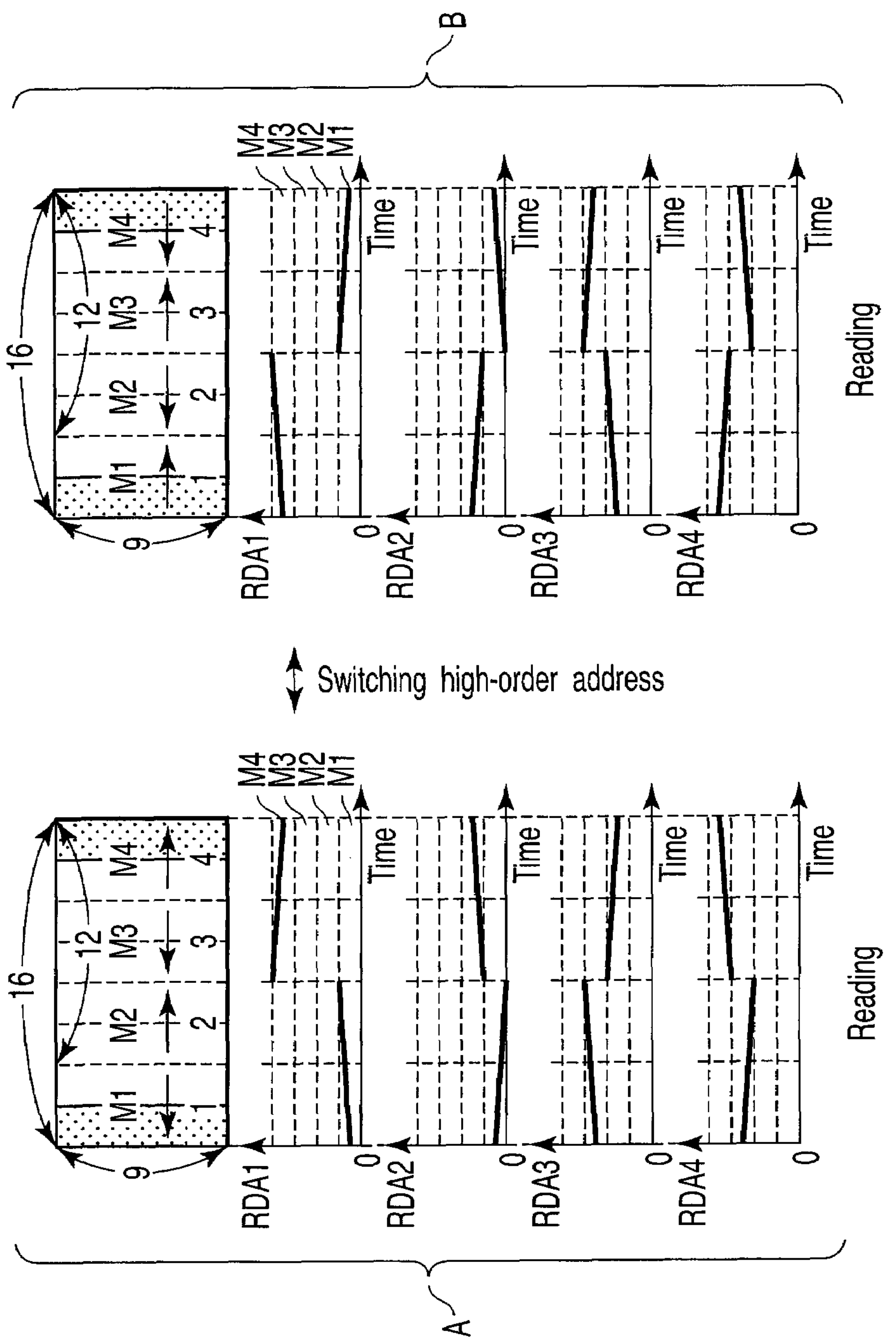
FIG. 9 is a preferred explanation view illustrating other example of reading the data from the memory circuits illustrated in FIGS. 1 and 2.

Examples A and B in FIG. 9 show aspects of variations in read addresses RDA1-RDA4 of memories M1-M4 in the case of the centered display. It is assumed that memories M1-M4 have been written as described in FIG. 5A.

In the example of example A of FIG. 9, the variation in read address RDA1 reads each half data in the memory 1 and memory 4 at the anterior half and the posterior half of the one horizontal period. The variation of read address RDA2 reads the data of each half of the memory 1 and memory 2 over the one horizontal period. The variation of read address RDA3 reads the data of each half of the memory 3 and memory 2 over the one horizontal period. The variation of read address RDA4 reads the data of each half of the memory 3 and memory 4 over the one horizontal period. The write directions of the signal into the horizontal driver 211 for each region 1-4 on the display panel 213 become directions, like arrows described on the display panel 213 shown at the upper stage. The example B shows an example in which the read directions are opposed to those of the example A in FIG. 9.

In the case that the flat display device performs the centered display like this manner, while the display device reads the data stored in each of memories M1-M4 half-and-half to perform the centered display, the display device may simplify the write and the read processes by dividing at least a memory part corresponding to the display division regions into the number of memories of n times as many as the number of the memory part, by storing the data read half-and-half into each independent memory to read the data. For instance, if it is assumed that the display division region is substantially three-division region, the display device prepares 3n (n is integer not smaller than two) of individual memories. For instance, preparing six memories and sharing to store the data stored in each half region of memories M1-M4 into the six memories, respectively.

As described above, according to the present invention, the regions divided into n in a horizontal direction are division-driven. The digital video signal of one line is divided into n, the unit data of n pieces is each supplied to the n unit memories. Since the n unit memories are write-controlled and read-controlled, the aspect ratios may be switched. Moreover, the flat display device selects the direction of each of the write addresses and of the read addresses, and makes the arrangement order of the data to the adjacent driving regions be an inversion horizontal direction. Therefore, the display device may reduce the image noise at the borders of the division-driven regions. In other words, the analog signals produced by the DAC 112 to be transmitted to the horizontal driver 211 are continuous in terms of time at the sections corresponding to the borders of the regions. Thereby, there is no break and sudden variation of the analog signal on a transmission line.

Figure 10:
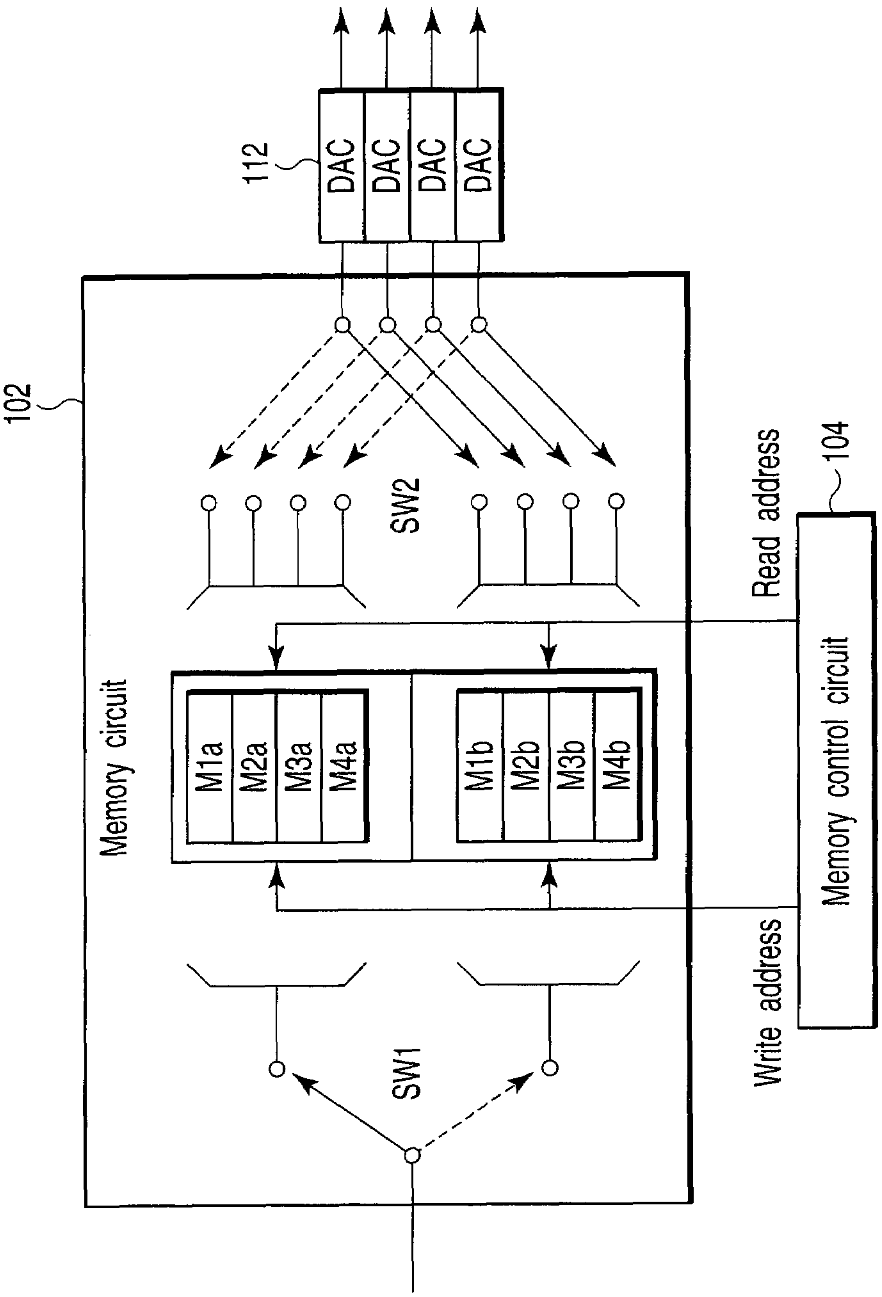
FIG. 10 is a preferred view illustrating an inner configuration example of the memory circuits illustrated in FIGS. 1 and 2.

FIG. 10 depicts a concrete example of the inside of the memory circuit 102. In the foregoing description, to make it easy to understand the explanation, a single system of memories M1-M4 is described. However, as a matter of fact, two systems are convenient for the explanation. That is, in the first one horizontal period, the data is written to memories M1*a*-M4*a*, and in the next one horizontal period, the data is written to memories M1*b*-M4*b*. During the writing of the data into one system of memories M1*a*-M4*a*, the data in the other system of memories M1*b*-M4*b* are read. The data in each memory is converted into an analog signal by the digital-to-analog converter.

As given above, in the concrete embodiment of the invention, the flat display device includes the memory circuit including four unit memories each storing the unit data, and the horizontal driver in which the signals read from the memory circuit are supplied to the corresponding-four registers. Further, the display device includes the display panel which is driven by the horizontal driver and the vertical driver and on which the regions divided into four in the horizontal direction are set in accordance with the four registers, and the memory control circuit which transfers the data in the four unit memories to the four registers.

The display device divides the one line of the digital video signal of the aspect ratio of 3:4 into three to obtain three pieces of unit data. The display device then supplies the three pieces of unit data to the three unit memories among the four unit memories. Further, the display device selects the access directions of the write or the read addresses for the three unit memories among the four unit memories so that each data to be transferred from the three unit memories to the three registers become the inverse horizontal directions between the foregoing adjacent regions.

Here, the display device selects, sometimes, the access directions of the write addresses to the unit memories so that, in writing the unit memories, each data to be transferred from the three unit memories to the three registers is brought into inversion horizontal directions between adjacent regions. In reading the unit memories, the access directions of the unit memories are set to the same directions as the ascending or descending address direction.

The display device selects, sometimes, the access directions of the write addresses to the unit memories so that the write order of each data to be written to the unit memories become the identical directions between the adjacent regions. In this case, the access directions of the read addresses of the unit memories are set to the inversion horizontal direction.

It is our intention that the invention is not limited to the specific details and representative embodiments shown and described herein, and in an implementation phase, this invention may be embodied in various forms without departing from the spirit or scope of the general inventive concept thereof. Various types of the invention can be formed by appropriately combining a plurality of constituent elements disclosed in the foregoing embodiments. Some of the elements, for example, may be omitted from the whole of the constituent elements shown in the embodiments mentioned above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flat display device, comprising:

a display panel which is driven by a horizontal driver and a vertical driver, and provided with a display face with an aspect ratio of 9:16, the display face being divided into four sub-display regions in a horizontal direction;

a memory circuit which substantially includes four unit memories respectively storing unit data corresponding to the sub-display regions;

a plurality of registers which supplies signals read from the memory circuit to the horizontal driver; and a memory control circuit which transfers the data in the unit memories to the registers, the memory control circuit being controlled by one of a wide display selection signal and a 3:4 display selection signal, wherein, under the control of the memory control circuit, a full region-display state of the display panel is set if the wide display selection signal is set, and a non-full region-display state of the display panel where at least a portion of one of the four sub-display regions is not used to display an image is set if the 3:4 display selection signal is set, the memory control circuit divides one line of a digital video signal into three unit data elements when the digital video signal is a 3:4 digital video signal and the 3:4 display selection signal is set;

writes the three unit data elements in three of the four unit memories and reads the unit data in the three unit memories;

outputs write and read addresses corresponding to the sub-display regions, the write and read addresses each having a high-order address and a low-order address, the high-level address selecting an arbitrary unit memory of the four unit memories, the low-order address designating an address of the selected unit memory; and thereby sets the display panel to one of a left-sided display, a centered display, or a right-sided display according to the selection of the high-order address, and controls a data write or read direction in adjacent sub-display regions to be a laterally inverted direction according to the selection of the low-order address.

2. The device according to claim 1, wherein when a left-sided display is performed on the display panel, three registers on a left side are selected, and when a right-sided display is performed, three registers on a right side are selected.

3. The device according to claim 1, wherein when a centered display is performed on the display panel, access directions of write or read addresses of unit data corresponding to the display dividing regions to or from the corresponding-unit memories.

4. The device according to claim 3, wherein unit data for each display dividing region is distributed and written over the four unit memories, and the written unit data is read in accordance with each display dividing region.

5. The device according to claim 1, wherein an input processing circuit including an interpolation circuit is connected to a pre-stage of the memory circuit.

6. A driving method of a flat display device which comprises:

a display panel which is driven by a horizontal driver and a vertical driver, and provided with a display face with an aspect ratio of 9:16, the display face being divided into four sub-display regions in a horizontal direction;

a memory circuit which substantially includes four unit memories respectively storing unit data corresponding to the sub-display regions;

a plurality of registers which supplies signals read from the memory circuit to the horizontal driver; and a memory control circuit which transfers the data in the unit memories to the registers, the memory control circuit being controlled by one of a wide display selection signal and a 3:4 display selection signal, wherein, under the control of the memory control circuit, a full region-display state of the display panel is set if the wide display selection signal is set, and a non-full region-display state of the display panel where at least a portion of one of the four sub-display regions is not used to display an image is set if the 3:4 display selection signal is set, the method comprising:

dividing one line of a digital video signal into three unit data elements when the digital video signal is a 3:4 digital video signal and the 3:4 display selection signal is set;

writing the three unit data elements in three of the four unit memories and reading the unit data in the three unit memories;

outputting write and read addresses corresponding to the sub-display regions, the write and read addresses each having a high-order address and a low-order address, the high-level address selecting an arbitrary unit memory of the four unit memories, the low-order address designating an address of the selected unit memory; and thereby setting the display panel to one of a left-sided display, a centered display, or a right-sided display according to the selection of the high-order address, and controlling a data write or read direction in adjacent sub-display regions to be a laterally inverted direction according to the selection of the low-order address.

7. The method according to claim 6, wherein address directions of write address for three unit memories among the four unit memories are selected so that each data to be transferred from the four unit memories to the plurality of registers becomes the laterally inverted direction between the adjacent sub-display regions, and access directions of read addresses of the three unit memories are ascending or descending addresses.

8. The method according to claim 6, wherein address directions of read address for three unit memories among the four unit memories are selected so that a transmission direction of each data to be transferred from the four unit memories to the plurality of registers becomes the laterally inverted direction between the adjacent sub-display regions, and access directions of write addresses of the three unit memories are ascending or descending addresses.

* * * * *